June 22, 1965 JUN TAMIYA 3,191,120

BRIDGE-TYPE CATHODE INTERFACE IMPEDANCE TEST SET

Filed Feb. 14, 1961

INVENTOR,
J. TAMIYA.
BY Jack H Linscott

ATTORNEY.

3,191,120
BRIDGE-TYPE CATHODE INTERFACE IMPEDANCE TEST SET
Jun Tamiya, Tokyo, Japan, assignor to the United States of America as represented by the Secretary of the Army
Filed Feb. 14, 1961, Ser. No. 89,327
5 Claims. (Cl. 324—26)

The present invention relates to electrical measuring circuits and more particularly to an improved test set for measuring the impedance of the cathode in electron tubes.

In use, electron tubes sometimes develop a complex impedance at the interface between the metal base of the cathode and its oxide coating. This impedance varies in magnitude with tube life and operating conditions and has an adverse effect on tube performance, introducing frequency sensitive degeneration in amplifier circuits and causing waveform distortion in pulse circuits. The interface impedance can be represented as a complex impedance connected between an ideal impedanceless cathode and the cathode pin of the tube. Because only one terminal of this impedance is available, it cannot be measured by ordinary means, but requires specially designed equipment.

Recent improvement in cathode alloys have created a need for test sets capable of measuring interface impedances of the order of 5 ohms or less with time constants of .05 microsecond or less. The time constant of the impedance relates to the ratio of resistance to reactance therein. Pulse type test sets have proved inadequate for the accuracy required. Furthermore, the wide band necessary for the pulse operation passes noise over a large frequency band.

The present invention provides accurate measurement of the desired quality with the use of simple and inexpensive circuitry. In the device, a bridge circuit is used to compare the impedance of a standard tube with that of the tube to be tested, when both are fed with a plurality of sinusoidal signals. The use of sinusoidal signals permits the use of narrow band filters in the null detection circuit which greatly reduces noise and hence increases accuracy. Also, a novel means is provided for eliminating the necessity of manually adjusting the tube biases to correct for tube drift, thus simplifying the operation of the device.

Other objects and advantages of the invention will become apparent from the following detailed description and drawings, in which.

Figure 1:
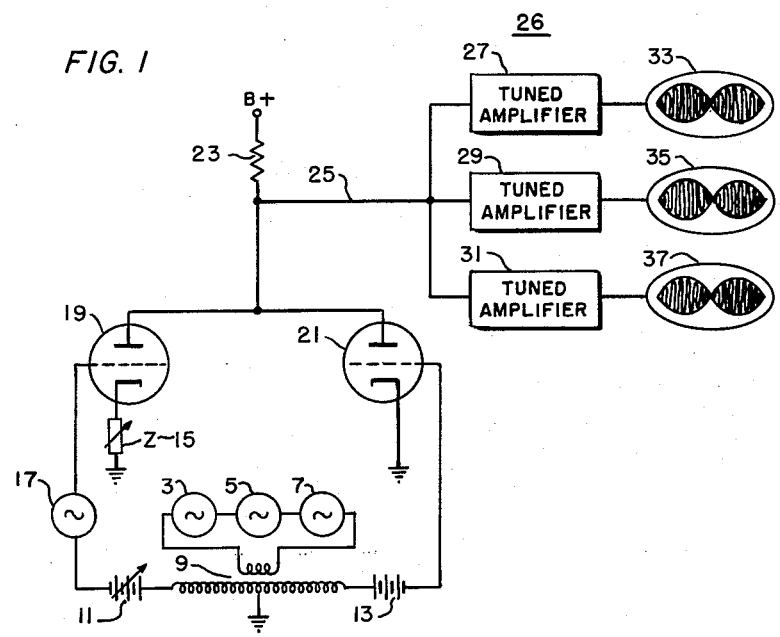
FIG. 1 is a circuit diagram of a preferred embodiment of the invention.
Figure 3:
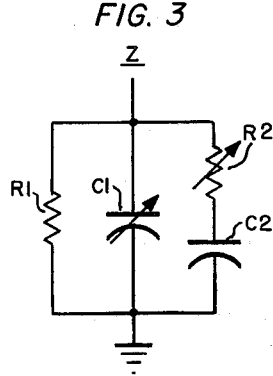
FIG. 3 is a detailed diagram of imepdance Z shown in FIG. 1.

In FIG. 1, 19 is a standard tube with zero interface impedance, preferably of the same type as the tube to be tested, 21. A variable impedance 15, shown in detail in FIG. 3, is connected in the cathode circuit of tube 19. This impedance simulates the cathode interface impedance of the tube under test. Three sinusoidal signals 3, 5 and 7 are fed to the control grid of each tube via transformer 9, the secondary of which is center tapped to feed the three signals in opposite phase to each tube. Under these conditions, the signal voltages from the two tubes will cancel and produce a null in common plate resistor 23 if the tube characteristics, i.e., the transconductance and cathode impedance, are equal. The null detector 26 comprises three tuned amplifiers 27, 29 and 31 each arranged to pass a narrow band of frequencies centered on one of the three signal frequencies 3, 5 and 7. The outputs of the three tuned amplifiers are fed to indicating devices 33, 35, and 37, which may be cathode ray oscilloscopes. Alternatively, a single triple beam oscilloscope may be substituted for the three shown or one single beam oscilloscope may be used and sequentially connected to the output of each amplifier by means of an electronic switch.

The complex impedance Z of FIG. 3 comprises resistor R1 and parallel variable capacitor C1, shunted by the series connected variable resistor R2 and capacitor C2.

In operation, the variable grid bias source 11 is adjusted until the transconductance of each tube is the same. This occurs when the signal voltage appearing on indicators 33, 35, and 37 are a minimum. Z is then adjusted until a null is obtained simultaneously on all three indicators 33, 35, and 37. This setting of Z then equals the cathode interface impedance of the tube 21. It often happens that drift will cause the transconductance of one or the other of the tubes to change, making it impossible to obtain a null. In order to eliminate manual re-adjustment of the tube biases each time this occurs, a small A.C. bias 17 is inserted in the grid of the reference tube. This A.C. bias continually varies the transconductance of 19 around an operating point for which the bridge is nearly balanced. If the D.C. bias voltage of the reference tube has been adjusted to near balance in advance, the balance can be observed on 33, 35, and 37 if it occurs anywhere in the range varied. As a result, such variation makes it unnecessary to rebalance the transconductance precisely each time the tube characteristics have drifted, or after the cathode elements have been changed by adjusting Z. This arrangement, therefore, not only overcomes the drift problem, but also simplifies the adjustment considerably, since only the cathode impedance Z need be adjusted to obtain an exact balance.

In order to achieve balance in the disclosed circuit, the alternating grid voltages of each tube must be equal in magnitude and opposite in phase and the tube transconductances must be equal. If the complex impedance 15 is adjusted to match the complex interface impedance of tube 21, the two alternating grid voltages will be of the same magnitude and opposite in phase since the voltage drops between each tube cathode and ground will be equal in magnitude and opposite in phase, however a difference in the transconductances in this case will cause the tube plate alternating currents to differ in magnitude, causing an unbalance. If the complex impedance 15 does not equal the complex interface impedance of tube 21 in both magnitude and angle, the two alternating grid voltages will have other than a 180° phase difference and balance will be impossible to achieve. Under this condition the phase error at the grids cannot be compensated for by adjustment of the transconductances of one of the tubes since the transconductance affects only the magnitude of the plate current. For these reasons both the cathode impedances and tube transconductances must be equal to achieve bridge balance.

Figure 2:
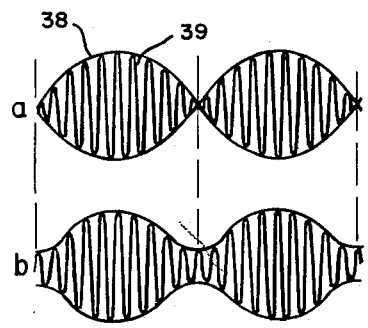
FIG. 2 illustrates waveforms which may appear at 33, 35 and 37 of FIG. 1

FIGS. 2a and b illustrate cathode ray traces from one of the tuned amplifiers for balanced and unbalanced conditions respectively. In curve a the signal frequency of the particular channel is represented by 39 and the A.C. bias frequency by 38. It can be seen that the signal frequency passes through a point of zero amplitude, indicating that Z is adjusted to equal the interface impedance of the tube under test. In curve b, the signal frequency does not pass through zero amplitude, indicating unbalance.

The frequencies of the three signal sources 3, 5 and 7 are chosen to cover the range of time constants encountered in ordinary interface impedances and also to minimize error due to higher harmonics generated by non-linearities in the circuit. The use of a plurality of sine waves to simultaneously energize the bridge permits the use of narrow band filters in the tuned amplifiers which greatly reduces the noise which could be encountered in wide band pulse systems. Furthermore, in pulse systems the high frequency components of the pulse have small amplitudes, and these high frequencies are of importance in the measurement of short time constants. With the circuit disclosed herein, the relative amplitudes of the signal frequencies can be individually controlled to produce maximum accuracy.

It should be noted that the number of signal frequencies used need not be limited to three, any number may be used, provided a tuned amplifier channel is provided for each. Further, the frequency of 17 should be substantially different from any of the signal frequencies. In a test set constructed according to the invention, the three signal frequencies were 200 kc., 1.1 mc. and 5 mc. The "wobbling" signal 17 was obtained from a 60 cycle filament supply.

While the invention has been described in connection with a particular embodiment it should be understood that the device is subject to many modifications. Accordingly, the invention should be limited only by the scope of the appended claims.

What is claimed is:

1. A cathode interface bridge comprising a cathode interface impedanceless reference tube and a tube under test, the anodes of said tubes being connected to a source of power via a common impedance, an adjustable complex impedance connected in the cathode circuit of said reference tube, means to supply a plurality of sinusoidal signals of different frequencies simultaneously and in opposite phase to the grids of said tubes, and means connected to said common impedance to simultaneously detect and indicate bridge balance at each of said different frequencies.

2. The structure of claim 1 wherein said last-named means comprises a tuned amplifier and a cathode ray indicating means for each of said sinusoidal signals.

3. The structure of claim 1 further including direct current bias means for adjusting the transconductance of each tube to approximate equality and an alternating current bias means connected in the grid circuit of one of said tubes, said alternating current bias being substantially different in frequency from any of said sinusoidal signals.

4. A cathode interface impedance bridge comprising a cathode interface impedanceless reference tube and a tube under test, the anodes of said tubes being connected together, a common anode resistor connected between said anodes and a source of power, an adjustable complex impedance connnected in the cathode circuit of said reference tube, means to supply three sinusoidal signals of different frequency and in opposite phase to the grids of said tubes, three tuned amplifiers connected to the anodes of said tubes, each of said amplifiers being tuned to one of said three sinusoidal signals, a cathode ray indicating means connected to each of said tuned amplifiers, direct current bias means in the grid circuit of each of said tubes and alternating current bias means in the grid circuit of one of said tubes, the frequency of said last-named means being substantially different from that of any of said sinusoidal signals.

5. A cathode interface imepdance test set comprising; a cathode interface impedanceless reference tube and a tube-under-test, the anodes of said tubes being connected to a source of power via a common impedance, an adjustable complex impedance connected in the cathode circuit of said reference tube, means to supply a plurality of sinusoidal signals of different frequencies simultaneously and in opposite phase to the grids of said tubes, and separate null detecting means for each of said different frequencies, said detecting means being connected to said common impedance.

References Cited by the Examiner
UNITED STATES PATENTS 2,412,231  12/46  Sharkey _____ 324—26 X
2,664,543  12/53  Thayer _____ 324—20
2,782,366  2/57   Wall _____ 324—25 X

OTHER REFERENCES

The Dependence of Mutual Conductance on Frequency of Aged Oxide-Cathode Valves and Its Influence on Their Transient Response, Tillman et al., Proceedings of the Institute of Electrical Engineers, pages 8–15, 34–38, 144–153, Part IV, No. 5, October 1953.

WALTER L. CARLSON, *Primary Examiner.*

LLOYD McCOLLUM, *Examiner.*